United States Patent [19]

Sarka

[11] 4,309,804
[45] Jan. 12, 1982

[54] METHOD FOR ATTACHING DIE PLATES TO CYLINDER SEGMENTS

[76] Inventor: Albert J. Sarka, 18828 Canyon Rd., Fairview Park, Ohio 77126

[21] Appl. No.: 27,469

[22] Filed: Apr. 5, 1979

[51] Int. Cl.³ .................. B23P 15/24; B23P 15/28
[52] U.S. Cl. .................................. 29/407; 29/464; 33/184.5; 493/367; 493/368; 493/475; 76/107 C; 101/DIG. 12
[58] Field of Search ........... 29/407, 720, 721, 464, 29/468; 33/184.5, 182; 93/58.2 R, 58.2 F, 59 R, 58.1; 76/107 C; 101/DIG. 12; 493/367, 368, 475, 468, 471, 370

[56] References Cited

U.S. PATENT DOCUMENTS

| | | | |
|---|---|---|---|
| 2,668,363 | 2/1954 | Lippitt | 101/DIG. 12 |
| 2,736,968 | 3/1956 | Faeber | 33/184.5 |
| 2,907,112 | 10/1959 | Dutton | 33/184.5 |
| 3,520,253 | 7/1970 | Head, Jr. | 33/184.5 |
| 3,613,252 | 10/1971 | Moos | 101/DIG. 12 |
| 4,033,259 | 7/1977 | Schuhmann | 33/184.5 |

*Primary Examiner*—Daniel C. Crane
*Attorney, Agent, or Firm*—Yount & Tarolli

[57] ABSTRACT

There is disclosed a method and apparatus for accurately attaching a die plate to a cylinder segment in a manner that assures accurate registration of two die plates so attached to cylinder segments used in a cutting and creasing machine to cut or crease material passing through a nip formed therebetween. Pins on the arbor in the cutting and creasing machine accurately locate the cylinder segments. A "Make Ready Machine" is used to accurately locate each die plate on a cylinder segment. The "Make Ready Machine" includes axial and circumferential position indicators which are used to accurately place each cylinder segment in a predetermined position when it is mounted in the Make Ready Machine. Once the cylinder segment is in the predetermined position, the die plate is placed on the cylinder segment and moved until each of three lands on the die plate are in proper alignment with a view finder on the Make Ready Machine. The lands are formed on the die plate in a predetermined relationship with the lands which do the cutting and creasing. When the die plate is thus accurately located on the cylinder segment it is riveted in place, and any excess extending beyond the axial edges of the cylinder segment is removed. The cylinder segment with the die plate thus connected may then be placed in a cutting and creasing machine. When a second die plate is mounted to a second cylinder segment in the same manner, it may be mounted in a cutting and creasing machine to cooperate with the first die plate. Accurate registration of the die plates is assured because each is mounted in a predetermined position on a cylinder segment and each cylinder segment is in turn mounted in a predetermined position on the cutting and creasing machine.

8 Claims, 5 Drawing Figures

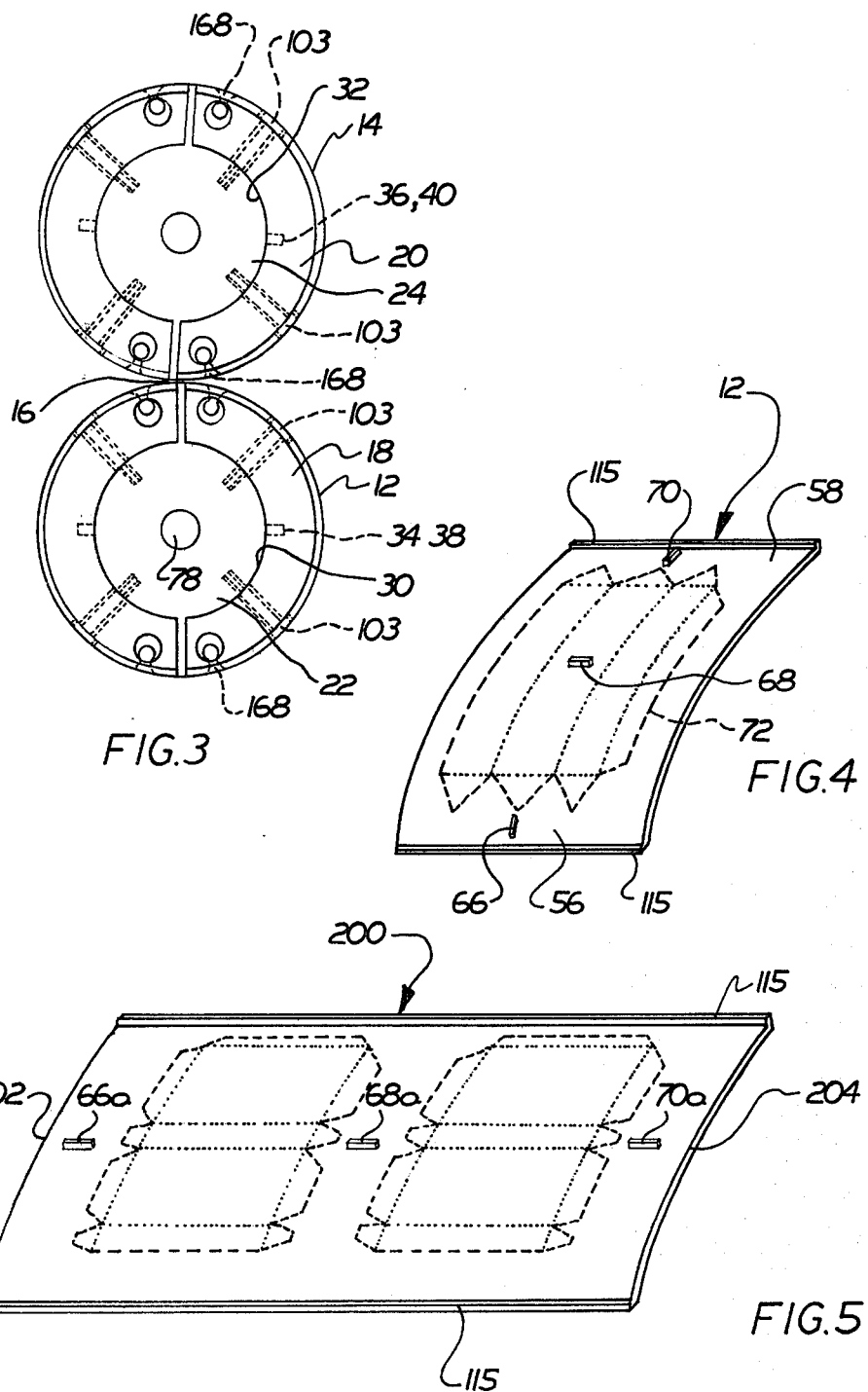

METHOD FOR ATTACHING DIE PLATES TO CYLINDER SEGMENTS

BACKGROUND OF THE INVENTION

The present invention provides a method and apparatus for attaching a die plate to a cylinder segment which forms a side of a nip in which material is cut or creased. In particular the present invention provides a method and apparatus for attaching such a die plate to a cylinder segment in a manner which assures proper registration between two die plate attached in such a manner to two cylinder segments.

In a known cutting and creasing machine, material may be rupture cut or creased when it passes through a nip formed between a cooperating pair of die plates. Such a machine is shown in U.S. patent application Ser. No. 760,663, entitled "Cutting Apparatus" by Albert J. Sarka, filed Jan. 19, 1977. In this machine each die plate is attached in a fixed position to a semicircular cylinder segment which in turn is attached to a rotatable arbor.

Two such cylinder segments with die plates attached are connected with a pair of arbors to form a nearly continuous cylindrical die on each arbor. The arbors, and hence the cylinder segments and die plates, are rotated in opposite directions and material advanced through the nip between them is cut or creased. A known advantage of utilizing die plates which are attached to cylinder segments is that the die plates may be formed to provide a continuous cut or crease around a circumference of the die plates. This in turn enables such die plates to form a continuous cut along the length of a web of material.

Accurate registration between the lands on cooperating die plates is essential to proper cutting and creasing. In the past, circumferential registration of cooperating die plates with each other has been accomplished by moving one of the cylinder segments and the attached die plate circumferentially with respect to the arbor on which it is mounted.

The problem of accurate registration of cooperating plates is an old one, both in the printing art and in the cutting and creasing art. Plate cylinders for use in printing presses have been provided with axially extending gaps in which are disposed clamps which engage opposite ends of a printing plate. Registration is accomplished by moving the clamps circumferentially or axially until proper registration is achieved. The printing plates may also be provided with accurately located holes, and, in that case the adjustable clamps in the plate cylinder have corresponding pins to further assist in accurate registration. However, the gap required in a cylinder for plate clamps precludes the use of known registration techniques if a continuous cut is to be made.

It is also known to provide a fixed clamp on the plate cylinder to hold the printing plate fixed with respect to the plate cylinder. Registration is then achieved by mounting the cylinder so that it may be moved axially and/or circumferentially with respect to a cooperating cylinder.

However, difficulties have persisted in achieving proper registration especially when one plate is skewed with respect to the axis of rotation of the cylinder to which it is attached. In such a case complicated mechanisms and bearings have been required which permit the entire cylinder to be counter-skewed to correct for skew of the plate attached to it.

SUMMARY OF THE INVENTION

According to the present invention, a die plate is accurately positioned on a cylinder segment used in a cutting and creasing machine to eliminate skew and to provide for accurate registration between cooperating die plates. The cylinder segments used in the practice of the present invention are provided with accurately located holes on their interior surface which mate with cooperating pins extending from the arbor. The pins and holes hold each cylinder segment in a predetermined axial and circumferential position on the arbor to which it is attached.

Accurate registration is accomplished by mounting each die plate on a cylinder segment in the exact position required to achieve accurate registration. Once each die plate is properly positioned, it is fixed to the cylinder segment with rivets. A "Make Ready Machine" makes accurate positioning of the die plates possible. The "Make Ready Machine" is provided with a rotatable arbor which has pins located in the same position as the pins on the arbors in the cutting and creasing machine. Using the pins, a cylinder segment is mounted on the arbor in the "Make Ready Machine" in the same position relative to the arbor it would be in in the cutting and creasing machine. A die plate is then placed on the cylinder segment, and its circumferentially opposite edge portions which extend beyond the axial edges of the cylinder segment are gripped loosely by clamps to hold the die plate against the cylinder segment.

The "Make Ready Machine" also includes a view finder and measuring means for determining when the arbor and attached cylinder segment have been rotated to a predetermined position and for accurately positioning a die plate on the cylinder segment once the cylinder segment is in the predetermined position.

To assist in positioning the die plates accurately, each die plate is provided with three lands which are formed on the die plate in a predetermined relationship with the cutting and creasing lands. Using the view finder and the lands, the die plate is accurately positioned on the cylinder segment. Thereafter the clamps are tightened and the die plate is riveted to the cylinder segments. A trimming mechanism is used to cut off the die plate end portions where the clamps grip, and this leaves the die plate even with the axial edges of the cylinder segment.

Two of the three lands on each die plate are located adjacent opposite edges of the die plates. These lands are used for removing skew between the die plate and the cylinder segment. The third land, the timing land, is located midway between the two skew lands. The timing land is used to assure proper timing between cooperating die plates.

A second die plate which has cutting and creasing lands to cooperate with the cutting and creasing lands on the first die plate is connected with a second cylinder segment in the same manner as described above. To assure accurate registration of the second die plate with the first die plate, the arbor in the "Make Ready Machine" and second cylinder segment mounted on it are rotated to the same predetermined position to which the first cylinder segment was rotated. The view finder and measuring means are used again to determine when the arbor and cylinder segment have reached the predetermined position. Thereafter the two skew lands and the timing land are used together with the view finder to position the second die plate on the second cylinder segment accurately. Once this has been accomplished, the second die plate is fastened to the second cylinder segment and trimmed in the same manner as before.

In a similar manner a third and fourth die plate which have cooperating cutting and creasing lands formed thereon can be mounted to third and fourth cylinder segments. When four cylinder segments each have a die plate accurately positioned and attached thereto, the four cylinder segments are mounted, two on each arbor, in the cutting and creasing machine. Because of the accurate positioning of the die plates on the cylinder segments, no further adjustment is required in the cutting and creasing machine to effect proper registration between the cutting and creasing lands. However, the cutting and creasing machine may be provided with registration adjustments to synchronize the die plates with printed matter on the material to be cut.

BRIEF DESCRIPTION OF THE DRAWINGS

The above and other features of the present invention will become more apparent to those skilled in the art to which it pertains upon reading the following description of preferred embodiments of the present invention when taken together with the accompanying drawings in which:

FIG. 3 illustrates the manner in which cooperating die plates are mounted on cylinder segments and the cylinder segments are in turn mounted on arbors in a cutting and creasing machine;

FIG. 4 is a pictorial illustration of a rectangular die plate which has cutting and creasing lands formed thereon shown after it has been bent to at least partially conform to the arcuate surface of a cylinder segment, and also having three lands aligned with the major axis of the die plate and in a predetermined spacial relationship with the cutting and creasing lands; and FIG. 5 is a view generally similar to FIG. 3 but showing a rectangular die plate in which the major axis extends axially of a cylinder segment and showing the three aligned lands in a predetermined relationship with the cutting and creasing lands.

DESCRIPTION OF PREFERRED EMBODIMENTS

Figure 1:
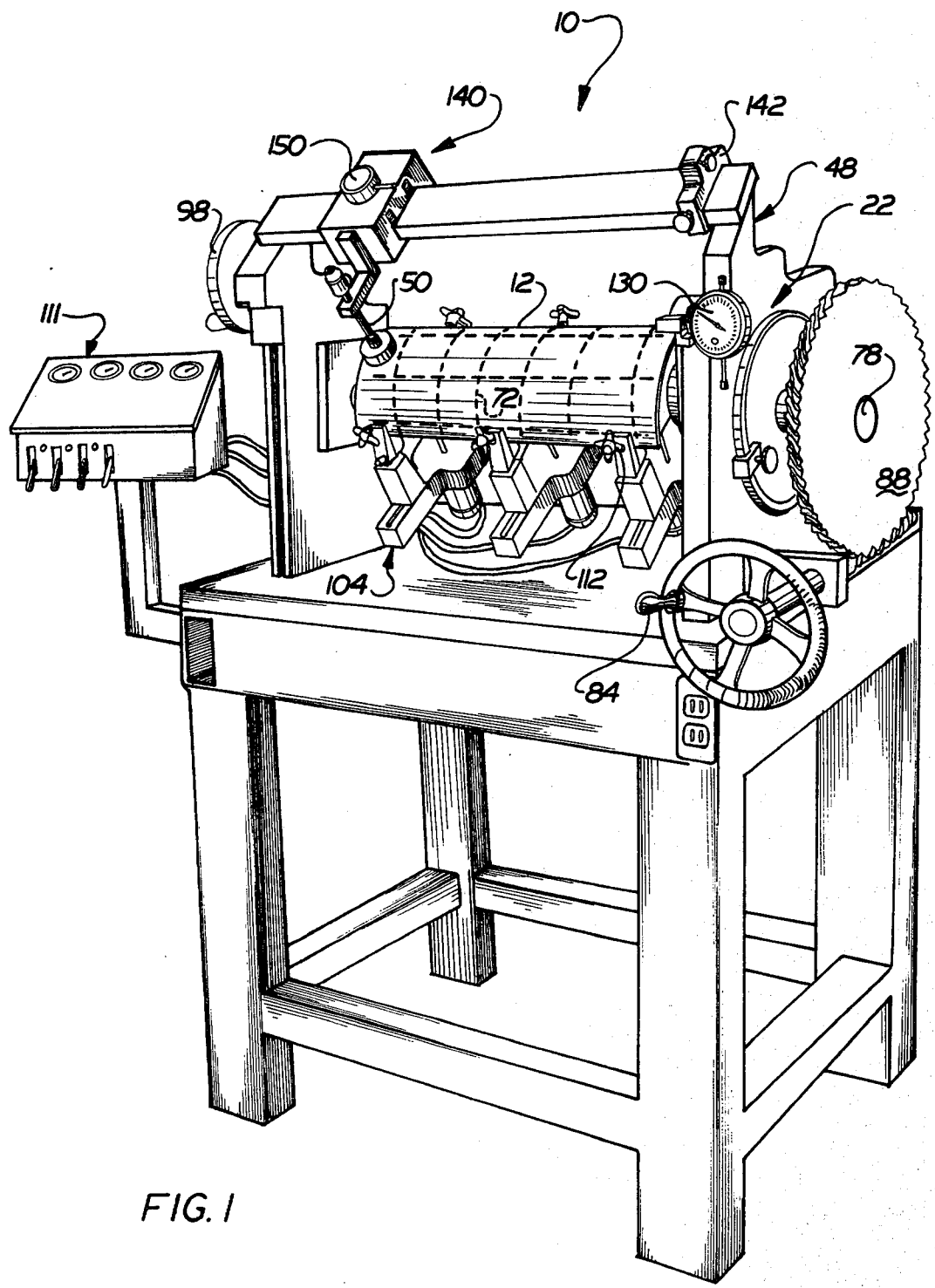
FIG. 1 is a pictorial illustration of an apparatus useful for accurately positioning a die plate on a cylinder segment.
Figure 2:
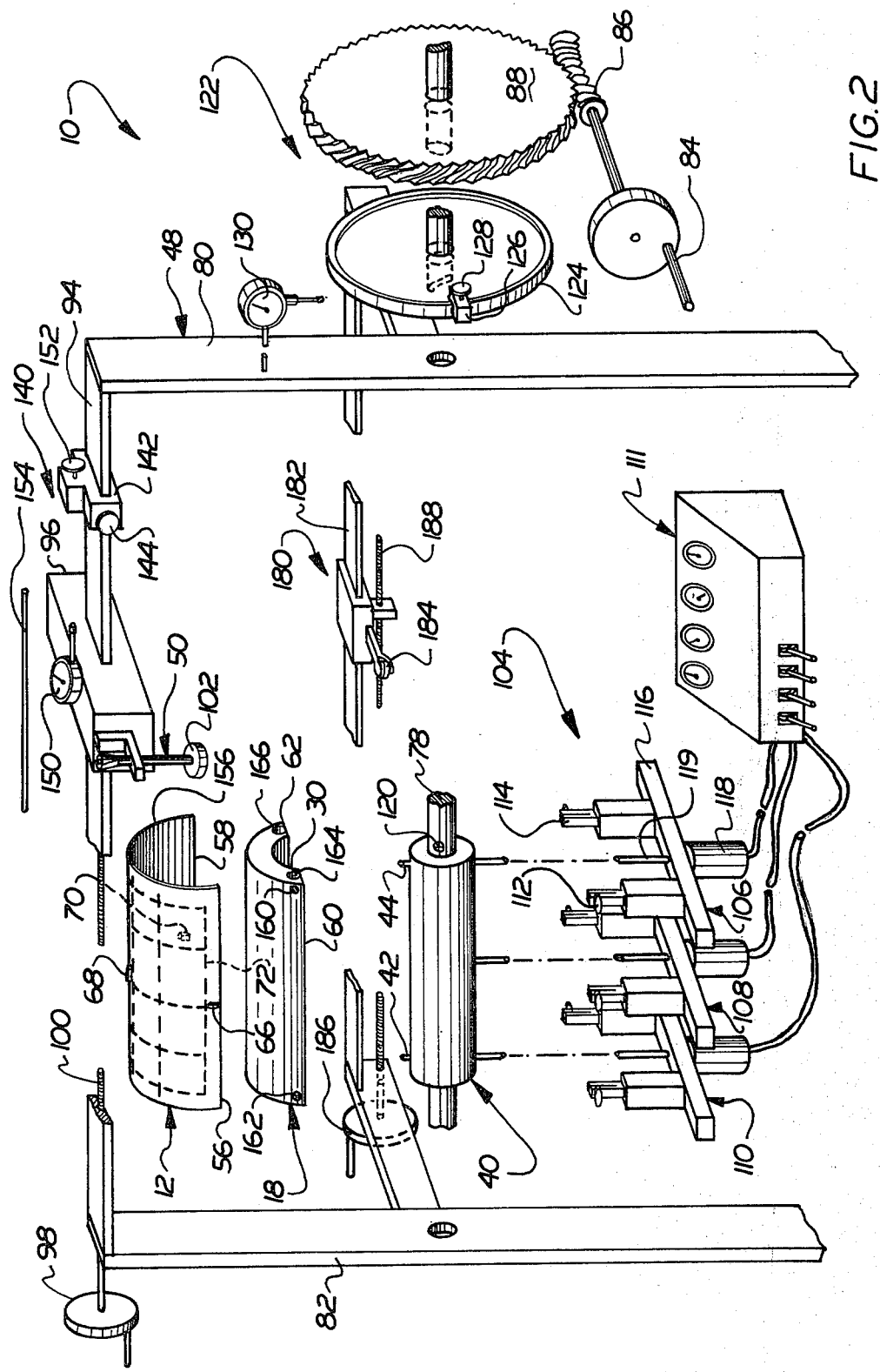
FIG. 2 is a schematic exploded view of a portion of the machine illustrated in FIG. 1.

The present invention relates to a method and apparatus for attaching a die plate to a cylinder segment in a manner which assures proper registration between cooperating die plates. A pictorial illustration of an apparatus 10 suitable for practicing the present invention is shown in FIG. 1. FIG. 2 shows a partially schematic exploded view of the same apparatus.

Two die plates 12 and 14 (FIG. 3) cooperate to form a nip 16 in a cutting and creasing machine (not shown) in which a web of material is rupture cut or creased. Accurate registration is provided by accurately locating each die plate 12, 14 on a corresponding cylinder segment 18 and 20, respectively, and by accurately locating each cylinder segment on an arbor 22 and 24, respectively.

Each arcuate cylinder segment 18 and 20 has a semicylindrical interior surface 30 and 32 which fits closely the cylindrical outside surface of the arbors 22 and 24 of the cutting and creasing machine (not shown). A number of pins 34 and 36 extend radially outward from the arbors 22 and 24 respectively and cooperate with corresponding holes 38 and 40 to assure accurate positioning of the cylinder segments 18 and 20 on the arbors 22 and 24.

The "Make Ready Machine" 10 (FIGS. 1 and 2) is useful for accurately positioning a die plate 12 on a cylinder segment 18. The machine 10 has an arbor 40 the same diameter as the arbors 22 and 24 (FIG. 3) in the cutting and creasing machine (not shown). The arbor 40 (FIG. 2) also includes pins 42 and 44 which are identical to the pins 34 and 36 on arbors 22 and 24. When the arbor 40 in the machine 10 is rotated through a given angular rotation, the cylinder segment 18 mounted on the arbor turns the same amount.

The machine 10 includes measuring means (to be discussed below) which enable the arbor 40 and the attached cylinder segment 18 to be rotated to a predetermined angular position with respect to the machine frame 48. The machine 10 also includes a view finder 50 which, together with the measuring means, is used to position the die plate 12 on the cylinder segment 18 accurately.

When a cylinder segment 18 has been mounted on the arbor 40 of the machine 10, the cylinder segment and arbor are rotated to a predetermined angular position. Thereafter the die plate 12 is placed on the cylinder segment and moved until it is in a desired position relative to the cylinder segment. Once the die plate 12 is in the proper position, it is fixedly connected to the cylinder segment 18, and the edges 56 and 58 of the die plate 12 are trimmed even with the edges 60 and 62 of the cylinder segment 18. Thereafter the cylinder segment 18 with the die plate 12 attached is removed from the machine 10 and ready for mounting on the arbor 22 (FIG. 3) of the creasing and cutting machine.

After one die plate 12 has been attached to one cylinder segment 18 in a predetermined position on the cylinder segment, a second cylinder segment identical to the first one, such as the cylinder segment 20 shown in FIG. 2, is mounted on the arbor 40 of the machine 10. The arbor 40 is then rotated to the predetermined angular position using the measuring means, and the die plate 14 is accurately positioned on the cylinder segment 18. Thereafter the die plate 14 is fastened to the cylinder segment 20 and trimmed. The cylinder segment 20 and the attached die plate 14 are then removed from the machine 10 and ready for installation on the arbor 24 (FIG. 3) of the cutting and creasing machine.

To assist in the accurate positioning of the die plates 12 and 14 each die plate is provided with lands 66, 68 and 70 (FIG. 4). The lands 66, 68 and 70 are produced at the same time and by the same method as used to make the cutting and creasing lands 72. Lands 66, 68 and 70 are located in a predetermined position relative to the cutting and creasing lands 72. Conventional photo-engraving techniques may be used to produce both the cutting and creasing lands 72 and lands 66, 68 and 70.

Of the three lands on each die plate, two lands 66 and 70 are for removing skew, and are therefore called skew lands. The skew lands 66 and 70 are located adjacent the opposite edge portions 56 and 58, respectively, of the die plate 12 (FIG. 4). Before the die plate 12 is bent to conform to the arc of the cylinder segment 18 (FIG. 2), the die plate is rectangular, and the skew lands 66 and 70 are located approximately midway along the most distant opposite edges 56 and 58 of the die plate, that is, on opposite minor edges of the die plate. As will become more clear below, any skew which exists between the die plate 12 (FIG. 2) and the cylinder segment 18 is removed by moving the die plate until the skew lands 66 and 70 lie in a predetermined plane normal to the axis of the arbor.

A third land, 68, the timing land, is located midway between the skew lands 66 and 70 (FIG. 4). The timing land 68 is also generally rectangular and extends perpendicular to a line connecting the skew lands 66 and 70 and therefore parallel to the axis of rotation of the cylinder segment 18. The timing lands 68 on cooperating pairs of die plates such as die plates 12 and 14 (FIG. 3) ensure that cooperating die plates are located in the proper circumferential positions on their respective arbors. By putting the timing land 68 in the proper circumferential position with respect to each cylinder segment 18, 20 (FIG. 3) proper timing of die plate 12 with respect to die plate 14 is assured.

As previously noted the machine 10 (FIG. 2) has a rotatable arbor 40. The arbor 40 is mounted on a shaft 78 which extends between vertical members 80 and 82 of the machine frame 48. The arbor 40 is rotated by means of a crank 84, a pinion 86, and a gear 88 which is in meshing engagement with the pinion 86 and fixedly connected with the shaft 78.

Extending between the vertical members 80 and 82 of the machine frame 48 is a track 94 on which the view finder 50 may be moved. The track 94 is parallel to the axis of rotation of the arbor 40.

A carriage 96 is mounted for sliding movement on the track 94 and is driven by a crank 98 and a threaded rod 100. The carriage 96 carries the view finder 50 used in positioning the die plate 12 on the cylinder segment 18. The view finder 50 has optical lenses to magnify its view and cross hairs which may be used to accurately position the lands 66, 68 and 70 when they are in the field of view. A light 102 is attached at the bottom of the view finder 50 to illuminate the field of view.

The first step in using the machine 10 to accurately locate the die plate 12 on a cylinder segment 18 is to place the cylinder segment on the arbor 40. The pins 44 support the cylinder segment 18 in a predetermined position by closely engaging holes 40 (FIG. 3) in the interior surface 30 of the cylinder segment. Suitable bolts 103 may be used to fasten the cylinder segment 18 to the arbor 40.

Next the die plate 12 is placed on the cylinder segment 18. The die plate 12 (formerly flat) is bent to conform generally to the surface of the segment 18. Thereafter a clamping mechanism 104 engages opposite edge portions 56 and 58 of the die plate 12 where it extends beyond the axially extending edges 60 and 62 of the cylinder segment 18 to draw the die plate against the exterior surface of the cylinder segment 18.

The clamp mechanism 104 includes three pneumatic clamping units 106, 108 and 110 and a control unit 111 to control the supply of air to the clamping mechanism 104. The clamping units 106, 108 and 110 are substantially identical, and therefore only a clamping unit 106 will be described in detail.

The clamping unit 106 includes two clamps 112 and 114 which may be tightened to engage edges 56 and 58 of the die plate 12. The edges 56 and 58 of the die plate 12 may have radially extending lips 115 which the clamps 112 and 114 engage. In this case the clamps 112 and 114 may easily be tightened enough to hold the die plate 18 steady while still permitting it to be moved slightly.

The two clamps 112 and 114 are joined by a rigid member 116 in the center of which is a pneumatic cylinder 118. The cylinder 118 is fixedly connected to the rigid member 116 and the piston rod 119 extends into and is fixed to the arbor 40 on the opposite side of the arbor from the cylinder segment 18. When the pneumatic cylinder 118 is energized by the control unit 111, the rigid member 116 and the clamps 112 and 114 are forced away from the arbor 40 by the movement of the piston rod 119, thereby pulling the die plate 12 against the surface of the cylinder segment 18. The air pressure in the cylinder 118 may be varied by control unit 111 to facilitate moving the die plate 12 on the cylinder segment 18.

When the die plate 12 has been placed on the cylinder segment 18, the arbor 40 is rotated to a predetermined angular position. To do this, the view finder 50 is moved to the right as viewed in FIGS. 1 and 2 along the track 94 until it is aligned with a target 120 on the shaft 78. It may be necessary to turn the crank 84 to rotate the arbor 40 until the target 120 is aligned with the cross hairs in the view finder 50.

To place the second die plate 14 in the proper position on the second cylinder segment 20, the arbor 40 and the second cylinder segment will need to be returned exactly to the same predetermined angular position to which the first cylinder segment was turned. To facilitate this the machine 10 is equipped with an angular position indicator 122. The angular position indicator 122 includes wheel 124 fixedly connected with the shaft 78. A block 126 may be positioned at any desired location around the circumference of the wheel 124 and a set screw 128 locks the block 126 in position. A dial indicator 130 is connected with the frame. When the arbor 40 has been rotated so that the target 120 is aligned with the cross hairs of the view finder 50, the block 126 of the wheel 124 and the dial indicator 130 are adjusted so that the dial indicator reads zero. The arbor 40 may then be rotated to any angular position and returned to the zero position utilizing the block 126 and the dial indicator 130. In this manner the second cylinder segment 20 may be placed in the same angular position as the first cylinder segment 18.

With the arbor 40 in the predetermined angular position and the angular position indicator 122 set to zero, the axial position indicator 140 may be set. The axial position indicator 140 includes a stop which slides along the track 94 and has a manually rotatable set screw 144. While the view finder 50 remains aligned with the target 120 on the shaft 78, the stop 142 is moved along the track 94 until the dial indicator 150 on the carriage 96 reads zero. This is facilitated through the use of the adjustment screw 152 which has an end in contact with the probe of the dial indicator 150. When the view finder 50 is set on the target 120 and the dial indicator 150 reads zero, the stop 142 is clamped in place by tightening the set screw 144.

The machine 10 is now fully "zeroed," and the next step in positioning the die plate 12 in a desired position on the cylinder segment 18 is to move the die plate until the timing land 68 is in the appropriate position with respect to the cylinder segment 18. This is accomplished by moving the carriage 96 axially along the track 94 (to the left as viewed in FIGS. 1 and 2) until the view finder 50 is a predetermined distance from the stop 142. This predetermined distance is measured by positioning a rod 154 of fixed length between the end of the adjustment screw 152 on the stop 142 and the dial indicator 150. When the dial indicator 150 again reads zero, the view finder 50 is in the desired axial position, and the timing land 68 may now be aligned with the cross hairs in the view finder 50. This method of positioning the view finder 50 axially is utilized so that its exact position is known relative to the arbor 40 and cylinder segment 18, and so that it may be returned to that position when the second die plate 14 and the second cylinder segment 20 are installed in machine 10 (FIG. 3).

The exact length of the rod 154 is determined by the distance from one circumferential edge 156 of the die plate 12 to the timing land 68. The rod 154 must equal this distance plus the desired distance from the edge 156 of the die plate and the target 120 on the shaft 78. The exact length of the rod 154 is not critical, and it varies depending on the location of the timing lands 68 on cooperating die plates 12 and 14 (FIG. 3). However, the same rod 154 is always used for die plates 12 and 14 which cooperate with each other.

With the view finder 50 in the predetermined axial position and with the arbor 40 rotated to the predetermined angular position, the die plate 12 is moved until the timing land 68 is aligned in the cross hairs. This may be done by moving the die plate manually or by tapping it lightly with a hammer. It should be noted that the clamps 112 and 114 are loose enough to permit this movement of the die plate 12 and still tight enough to hold the die plate steady against the cylinder segment 18.

Next any skew which may exist between the die plate 12 and the cylinder segment 18 is removed. The skew lands 66 and 70 are located adjacent edge portions 56 and 58, respectively of the die plate 12. As mentioned above the skew lands 66 and 70 are rectangular and lie on a line connecting the midpoints of edges 56 and 58 when the plate 12 is flat. When the die plate 12 has been bent to conform to the shape of the cylinder segment 18 and when there is no skew between the die plate 12 and the cylinder segment 18 the skew lands 66 and 70 lie along a circumferential line on a surface of the die plate 12 which is normal to the axis of the cylinder segment 18.

To check the die plate 12 for skew with respect to the cylinder segment 18 the crank 48 is turned to rotate the arbor 40, the cylinder segment 18, and the die plate 12 until the cross hairs in the view finder are aligned with one of the edges, e.g., 56 of the die plate. If the skew land 66 is not aligned with the cross hairs in the view finder 50, the die plate is moved until the land is aligned with the cross hair 50. Then the crank 48 is turned to rotate the cylinder segment 18 and the die plate 12 until the opposite edge 58 is aligned with the cross hairs in the view finder 50. If the land 70 is aligned with the cross hairs in the view finder 50, then no further adjustment is necessary. However, if the land 70 is not aligned with the cross hairs in the view finder 50 then the die plate 12 must be moved until this condition is met.

Obviously, moving the die plate to align one of the lands 66, 68 and 70 with the cross hairs in the view finder 50 moves all of the lands to some extent. Therefore, it is good practice, when utilizing the machine 10, to repeat the steps of aligning the lands with the cross hairs until a check shows all three lands aligned with the cross hairs. If the skew lands 66 and 70 both align with the cross hairs in the view finder 50 when the die plate 12 and cylinder segment 18 are rotated, then it is sure that the die plate is not skewed with respect to the cylinder segment 18. Further, because the view finder 50 is a fixed axial position from the target 120 on the arbor 40, having both skew lands 66 and 70 aligned with the cross hairs in the view finder 50 assures that the die plate 12 is in the proper axial position on the cylinder segment 18. Additionally, when the timing land 68 is aligned with the cross hairs in the view finder 50, the die plate 12 is in the proper circumferential position on the cylinder segment 18.

Once the die plate 12 is in the proper position on the cylinder segment 18, the control unit 111 of the clamping mechanism 104 is actuated to increase the pressure supplied to the pneumatic cylinders 118. The pressure supplied to the clamping units 106, 108 and 110 may be individually adjusted to assure an even pull on the die plate 12. The clamping mechanism 104 pulls the die plate 12 firmly against the cylinder segment 18 and holds it in place. Good practice again dictates that the position of the lands be checked by rotating the arbor 40 while looking through the view finder.

The die plate 12 is affixed to the cylinder segment 18 by rivets, or any other suitable fastener. In the preferred practice, the cylinder segment 18 is provided with four radially extending holes, two of which 160 and 162 are shown in FIG. 2. Intersecting these radially extending holes 160 and 162 are axially extending holes 164 and 166. The die plate 12 is secured to the cylinder segment 18 by drilling holes through the die plate 12 which are accurately aligned with the radially extending holes 160 and 162 in the cylinder segment. Thereafter a rivet 168 (FIG. 3) is inserted in each of the radial holes and plastically deformed by conventional means to secure the die plate 12 to the cylinder segment 18.

Once the die plate 12 (FIG. 2) is secured to the cylinder segment 18, the portions of the die plate, including the edge portions 56 and 58, which extend beyond the edges 60 and 62 of the cylinder segment 18 are trimmed away. When this excess is removed, the cylinder segment 18 with the attached die plate 12 may be bolted to the arbor 22 (FIG. 3) in the creasing and cutting machine, and it will cooperate with another similar die plate and cylinder segment on the same arbor 22 to produce a cylindrical die surface which is free of any substantial gaps.

To trim the excess length from the die plate 12, a cutter assembly 180 is mounted on a track 182 which is fixedly mounted parallel to the axis of the shaft 78 and the arbor 40. The cutter includes a disc shaped knife 184 which is pressed against the die plate 12 to cut it as the cutter moves axially. To align the cutter disc 184 with the edge 60 or 62 of the cylinder segment 18, the crank 84 is turned to rotate the cylinder segment. A crank 186 and a rotatable threaded rod 188 are used to move the cutter along the track 182.

When the first die plate 12 has been fastened to the first cylinder segment 18, the process is repeated with a second die plate 14 and a second cylinder segment 20. When the second cylinder segment 14 has been bolted to the arbor 40 in the machine 10, the arbor 40 is rotated to the preset angular position. Use of the view finder 50 and the target 120 on the shaft 78 is not required. To return to the preset angular position, the crank 84 is rotated until the block 126 engages the dial indicator 130 and the dial indicator reads zero. This operation places the second cylinder segment 20 in the exact angular position that the first cylinder segment 18 was in during installation of the first die plate 12.

Likewise the axial position indicator 140, including the measuring rod 154 and the dial indicator 150 on the view finder carriage 96 are used to return the view finder 50 to the exact position it was in while the first die plate 12 was being located on the first cylinder segment 18. When the second cylinder segment 20 is thus aligned and when the timing land on the second die plate 14 is aligned with the cross hairs in the view finder 50, the timing land on the second die plate is in exactly the same position relative to the second cylinder segment 20 as the timing land on the first die plate 12 was relative to the first cylinder segment 18. This assures accurate cooperation between the first and second die plates 12 and 14.

Any skew which might exist between the second die plate 14 and the second cylinder segment 20 is removed in the same manner in which skew is removed between the first die plate and the first cylinder segment. The second cylinder segment 20 is rotated so that first one edge 60 of the second segment and then the other edge 62 of the cylinder segment is aligned with the view finder 50 while the skew lands 66 and 70 are aligned with the cross hairs in the view finder.

Once the second die plate 14 is accurately positioned on the second cylinder segment 20, it is fastened in place with rivets and the excess material is trimmed off. The second cylinder segment 20 is then removed from the machine 10 and ready to be installed in a cutting and creasing machine.

With the skew removed from both die plates 12 and 14 and timing lands 68 on both die plates in exactly the same position relative to the respective cylinder segments 18 and 20, the registration between the cooperating die plates is exact. No further adjustments need be made to achieve proper cooperation between the die plates 12 and 14 when the cylinder segments 18 and 20 are mounted on the arbors 22 and 24 (FIG. 3), respectively, in a cutting and creasing machine. However, the cutting and creasing machine may have registration adjustments which enable the die plates 12 and 14 to be adjusted together to achieve proper registration with pre-existing marks on the material to be cut or creased.

Although the die plate 12 (FIG. 4) has been shown and described as having skew lands 66 and 70 located adjacent to edges 56 and 58 which are circumferentially spaced from each other, this is not the only configuration contemplated. FIG. 5 illustrates a die plate 200 which is generally similar to the die plate 12, and similar numerals have been used to indicate similar parts. The die plate 200 is similar to the die plate 12 except that when it is bent to conform to the shape of a cylinder segment, such as the cylinder segment 18, the longest dimension of the (formerly) rectangular die plate 200 extends parallel to the axis of the arbor 22. In this case it has been found advantageous to locate the skew lands 66a and 70a adjacent axially opposite edges 202 and 204 of the die plate 200.

When mounting the die plate 200 on a cylinder segment 18 (FIG. 2), the same procedure is used as was described above in general. The only change in procedure relates to removal of skew. To remove skew it is necessary to remove the view finder 50 axially until it is aligned with first one edge, e.g., 202 and then the other edge, e.g., 204 and to move the die plate 200 to align lands 66a and 70a respectively. The skew between the die plate 200 and the cylinder segment 18 is removed when the view finder 50 may be aligned with either of the skew lands 66a or 70a by moving the view finder 50 axially along the track 94.

What is claimed is:

1. A method of attaching a pair of die plates to respective cylinder segments accurately relative to each other so that material-forming lands on the die plates properly cooperate with each other to cut material which is advanced through a nip defined by the die plates, each of said die plates having a timing land in a predetermined spacial relationship with said material-forming lands and two skew lands aligned with the timing land and located adjacent opposite edges of the die plates, said timing land and said two skew lands lying on a line which is transverse to the longitudinal extent of said die plate, said method comprising the steps of mounting one of said cylinder segments in a predetermined relationship with an arbor, placing a first die plate on the one of said cylinder segments, locating the first die plate at a particular circumferential position on the cylinder segment by (a) locating only a single view finder in a predetermined axial and circumferential position relative to the one of said cylinder segments, and (b) moving the first die plate until the timing land on the plate is accurately positioned relative to said view finder, locating the first die plate in a predetermined axial position on the one of said cylinder segments in a nonskewed position relative to the one of said cylinder segments by (a) locating the first die plate so that a first edge having a skew land is in a predetermined position relative to said view finder by changing the position of the arbor, cylinder segment, and first die plate as a unit relative to said view finder, (b) moving the first die plate relative to the one of said cylinder segments until the skew land adjacent said first edge of the first die plate is accurately positioned relative to said view finder, (c) locating the second, opposite edge of the first die plate which has a skew land in a predetermined position relative to said view finder, and (d) moving the first die plate relative to the one of said cylinder segments until the skew land adjacent said second edge of the first die plate is accurately positioned relative to said view finder, fixedly connecting said first die plate to said first cylinder segment, and repeating said steps to secure said second die plate to said second cylinder segment.

2. A method as set forth in claim 1 wherein said step of fixedly connecting said first die plate to said one of said cylinder segments includes the step of riveting said die plate to said cylinder segment.

3. A method as set forth in claim 1 wherein said step of locating the first die plate so that a first edge having a skew land is in a predetermined position relative to the view finder by changing the position of the arbor, cylinder segment, and die plate of a unit relative to the view finder includes the step of moving the view finder along a path parallel to the axis of the cylinder segment until it is aligned with said one edge of said first die plate.

4. A method as set forth in claim 1 wherein said step of locating the first die plate so that a first edge having a skew land is in a predetermined position relative to the view finder by changing the position of the arbor, cylinder segment, and die plate as a unit relative to the view finder includes the step of rotating said first die plate, said one of said cylinder segments and said arbor as a unit relative to said view finder.

5. A method as set forth in claim 3 or claim 4 further including the step of trimming the axially extending edge portions of said first die plate even with the axial edges of said one of said cylinder segments.

6. A method as set forth in claim 5 further including the step of pulling said first die plate against said one of said cylinder segments by pulling on the axially extending edge portions of said first die plate, and thereafter performing said step of fixedly connecting said first die plate to said one of said cylinder segments and trimming said first die plate.

7. A method of attaching a die plate having three aligned lands, two of which are at opposite edges of the die plate and the third between the first two and which lands lie on a line which is transverse to the longitudinal extent of said die plate, to a rotatable cylinder segment in proper circumferential register with respect to the cylinder segment, said method comprising the steps of positioning a cylinder segment so as to be rotatable about an axis, placing a die plate on said cylinder segment, providing only a single view finder movable axially parallel to the axis of rotation of the cylinder segment, rotating the cylinder segment until it is angularly aligned in a predetermined relationship with the axis of motion of said view finder, positioning said view finder a predetermined distance from one axial edge of the cylinder segment, moving the die plate on the cylinder segment until the middle one of the three lands is aligned with said view finder while maintaining the cylinder segment in the predetermined angular position with respect to the axis of motion of said view finder, fixedly connecting the die plate to the cylinder segment while maintaining the die plate in the position to which it was moved, removing skew between the cylinder segment and the die plate while maintaining the cylinder segment in the predetermined angular position with respect to the axis of motion of said view finder, said skew-removing step including the steps of moving said view finder axially until it is aligned with one edge of the die plate, moving the die plate until the land at the one edge is aligned with said view finder, moving said view finder to the opposite edge of the die plate, moving the die plate until the land at the edge is aligned with said view finder, and thereafter performing said step of fixedly connecting the die plate to the cylinder segment.

8. A method of attaching a die plate having three aligned lands, two of which are at opposite edges of the die plate and the third between the first two and which lands lie on a line which is transverse to the longitudinal extent of said die plate, to a rotatable cylinder segment in proper circumferential register with respect to the cylinder segment, said method comprising the steps of positioning a cylinder segment so as to be rotatable about an axis, placing a die plate on said cylinder segment, providing only a single view finder movable axially parallel to the axis of rotation of the cylinder segment, rotating the cylinder segment until it is angularly aligned in a predetermined relationship with the axis of motion of said view finder, positioning said view finder a predetermined distance from one axial edge of the cylinder segment, moving the die plate on the cylinder segment until the middle one of the three lands is aligned with said view finder while maintaining the cylinder segment in the predetermined angular position with respect to the axis of motion of said view finder, fixedly connecting the die plate to the cylinder segment while maintaining the die plate in the position to which it was moved, removing skew between the cylinder segment and the die plate, said skew-removing step including the step of rotating the cylinder segment until said view finder is aligned with one edge of the die plate while maintaining said view finder at the predetermined distance from the one axial end of the cylinder segment, moving the die plate until the land at that edge of the die plate is aligned with said view finder, rotating the cylinder segment until said view finder is aligned with an opposite end of the die plate, moving the die plate until the land at that edge of the die plate is aligned with said view finder, and thereafter performing said step of fixedly connecting the die plate to the cylinder segment.

* * * * *